(12) United States Patent
Borinato

(10) Patent No.: US 7,611,556 B2
(45) Date of Patent: Nov. 3, 2009

(54) CYCLONIC TOOL

(75) Inventor: Gianni Borinato, Schio (IT)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 443 days.

(21) Appl. No.: 11/327,142

(22) Filed: Jan. 6, 2006

(65) Prior Publication Data

US 2006/0150591 A1 Jul. 13, 2006

(30) Foreign Application Priority Data

Jan. 11, 2005 (GB) .................................. 0500469.2

(51) Int. Cl.
*B01D 45/12* (2006.01)
(52) U.S. Cl. ..................... 55/385.1; 55/346; 55/428; 55/459.1; 451/87; 451/88; 451/453; 451/456
(58) Field of Classification Search .............. 55/385.1, 55/337, 345, 346, 428, 300, 304, 459.1; 96/268; 451/87, 88, 453, 456
See application file for complete search history.

(56) References Cited

U.S. PATENT DOCUMENTS

| 3,843,198 | A | | 10/1974 | Reynolds | |
|---|---|---|---|---|---|
| 4,201,256 | A | * | 5/1980 | Truhan | 144/252.2 |
| 5,271,751 | A | | 12/1993 | Lägler | |
| 6,238,451 | B1 | * | 5/2001 | Conrad et al. | 55/323 |
| 6,833,016 | B2 | * | 12/2004 | Witter | 55/337 |
| 7,282,074 | B1 | * | 10/2007 | Witter | 55/300 |
| 7,323,023 | B2 | * | 1/2008 | Michele et al. | 55/337 |
| 2004/0231633 | A1 | | 11/2004 | Uhl et al. | |
| 2006/0107633 | A1 | * | 5/2006 | Walker | 55/385.1 |
| 2006/0107634 | A1 | * | 5/2006 | Ohlendorf | 55/385.1 |
| 2008/0016830 | A1 | * | 1/2008 | Witter | 55/337 |

FOREIGN PATENT DOCUMENTS

| DE | 19827173 | 12/1999 |
|---|---|---|
| EP | 1462179 | 9/2004 |
| FR | 2545749 | 11/1984 |
| JP | 10-277907 | 10/1998 |
| JP | 2004-106163 | 4/2004 |

* cited by examiner

*Primary Examiner*—Duane Smith
*Assistant Examiner*—Minh-Chau T Pham
(74) *Attorney, Agent, or Firm*—Knobbe, Martens, Olson & Bear, LLP

(57) ABSTRACT

A tool for shaping a material which, in use, generates dust. The tool (e.g., sander) has an outlet for discharging air and dust, a dust recovery chamber which is sealed during operation and at least one cyclone. The cyclone has an inlet port which is coupled to the outlet, an outlet port which communicates with the dust recovery chamber and an air vent from which cleaned air is expelled.

25 Claims, 7 Drawing Sheets

CYCLONIC TOOL

CROSS-REFERENCE TO RELATED APPLICATIONS

This application claims priority under 35 U.S.C. §119(a) to Great Britain Patent Application No. 0500469.2, filed Jan. 11, 2005, the entire contents of which are incorporated herein by reference.

FIELD OF THE INVENTION

The present invention relates to a tool comprising a cyclone for shaping a material which in use generates particulates (e.g., dust).

BACKGROUND OF THE INVENTION

For certain kinds of wood, dust which is generated during the operation of a tool (e.g. a sanding tool) may be fine and lightweight, and therefore potentially detrimental to health. For this reason, the tool is often combined with a device for preventing the release of dust into the surroundings so that the operator is not exposed to excessive amounts of dust while he or she is working.

In order to prevent or lower the emission of dust, mechanical filters such as a screen, mesh, sieve, paper bag or cloth have been combined with the tool which generates the dust. However, fine dust is difficult to filter out effectively. Such mechanical filters may become clogged or completely closed within a relatively short time. If this happens, the efficiency of the filter is reduced and dust is no longer prevented from reaching the local environment. Moreover, the tool may come to a standstill due to electric overload.

For dust generated by wood and other materials such as concrete, standards have been developed indicating for how long a worker may stay in air which contains a certain percentage of dust. In order to meet these standards, the aforementioned filters have to be cleaned from time to time or replaced. This may be costly in terms of time and money.

For preventing the release of very fine dust, fine dust filters are available. However, these filters are very expensive. Electrostatic filters are similarly expensive. In some cases, water has been used as a filtering means. However, such filtering means require permanent supervision and eventual replacement. Moreover it may be difficult to apply such filtering means with an everyday tool or a tool which is used by non-specialists (e.g. do-it-yourself enthusiasts) or which is used in different working positions.

Cyclones are known to be effective filters for separating dust from a gas. Such cyclones have relatively large dimensions and are widely used in chemical plants. U.S. Pat. Nos. 4,373,228 and 4,593,429 describe the application of a cyclone for separating dust front air in a vacuum cleaner.

SUMMARY OF THE INVENTION

One embodiment of the present invention is a tool for shaping a material comprising:
- a housing adapted externally to remove material particulates (d) from the material;
- an outlet in the housing through which in use the material particulates (d) are pneumatically discharged;
- a particulate recovery chamber having a wall constituting or containing a sealable particulate recovery port; and at least one cyclone located inside the particulate recovery chamber comprising:
  - an elongate body having a first end and a second end;
  - an inlet port at or near to the first end of the elongate body, wherein the inlet port is coupled to the outlet;
  - an outlet port at or near to a second end of the elongate body adapted to convey the material particulates (d) into the particulate recovery chamber; and
  - an air vent for expelling air from the elongate body.

In accordance with the invention, the cyclone advantageously loses no filtration efficiency over a lengthy period and is capable of cleaning a large quantity of air per unit time (e.g., at high speed) without being excessive large, heavy, expensive or requiring frequent service or maintenance. The cyclone is a very effective filter irrespective of whether it is comparable in size to the housing or smaller. By virtue of the particulate recovery chamber, the particulate filtrate (e.g., dust) may be easily and safely disposed of.

The tool of the invention is typically a hand-held tool. The tool may be a cutting, shaving, sanding or abrading tool. The tool is typically a sanding tool which may be used for sanding from above (e.g., for sanding a floor), from below (e.g., for sanding a ceiling) or for sanding a vertical surface (e.g., a wall such as a wall in a room). The sanding tool may be a belt sander, a vibration sander or a rotation sander. The sander may be employed for domestic or professional purposes. The particulates may be shavings, powder or dust.

The housing may have a handle which may be provided with a power cable and a power switch for controlling an electric motor. The electric motor may be arranged on a central axis within the upper part of the housing and typically has a rotary shaft extending along the central axis for driving a sanding plate or pad located outside the base of the housing. The outer surface of the pad typically holds a replaceable sanding paper which is applied to a work piece (such as a piece of wood) which causes dust to be generated. The base of the housing may be fully or partially open.

The particulate recovery chamber and/or the cyclone may be attached directly to the housing to achieve a compact tool.

A fan may be positioned within the housing. The fan may be adapted to cause material particulates to be pneumatically discharged through the outlet.

In a preferred embodiment, the tool further comprises a fan arranged within the housing so as to drive air and the material particulates through the outlet.

In a preferred embodiment, the tool further comprises a fan arranged within the housing so as to suck air from the air vent and cause material particulates to be pneumatically discharged from the outlet.

In a preferred embodiment, the housing contains a first (e.g., lower) interior cavity and a second (e.g., upper) interior cavity, wherein the first interior cavity is separate from the second interior cavity. The first and second interior cavity may be separated from each other by a main partition wall. Several cooling air inlets may be provided in the upper portion of the second interior cavity, preferably on a top wall of the housing.

In a preferred embodiment, the tool further comprises a transportation fan positioned in the first interior cavity; and a cooling fan and an electrical motor positioned in the second interior cavity. The cooling fan serves to cool the electric motor which is driving the transportation fan and the cooling fan via a rotary shaft.

In a preferred embodiment, the housing includes an auxiliary partition wall between the transportation fan and the outlet. In another preferred embodiment, the housing includes a guiding wall (e.g., an annular guiding wall) beneath the transportation fan.

In a preferred embodiment, the tool further comprises an air return tube coupling the air vent and the first interior cavity. The transportation fan may be an air transportation fan or air sucking fan. The air return tube may be firmly mounted on the exterior of the particulate recovery chamber (e.g., on the exterior of an upper wall).

The particulate recovery chamber may be sealable. In a preferred embodiment, the particulate recovery chamber has a wall (preferably a door) constituting or containing a sealable particulate recovery port. With such a provision, costs and operation time are saved and removal of the recovered material particulates (e.g., dust) through the particulate recovery port is straightforward.

In a preferred embodiment, the particulate recovery chamber is substantially cuboidal. It is constructionally straightforward for the particulate recovery chamber to be substantially cuboidal.

The particulate recovery chamber may have for example a cylindrical configuration or a rectangular or trapezoidal shape.

In a preferred embodiment, the particulate recovery chamber has an essentially trapezoidal shape. An essentially trapezoidal shape may be useful to obtain a very compact structure.

In a preferred embodiment, the particulate recovery chamber has a proximal wall, a distal wall and at least one (preferably more than one, more preferably four) side wall, wherein the cyclone is attached internally to the proximal wall or the distal wall. The side walls may include a base wall and an upper wall. The proximal wall may be attached directly to the housing. The distal wall may incorporate the air vent and any number of additional air vents. The (or each) air vent may be flush with the distal wall.

Preferably, the cyclone is attached internally to the proximal wall and the distal wall is pivotal on a hinge. This enables the distal wall to be used as a particulate recovery port through which recovered material particulates may be removed from time to time.

The elongate body of the cyclone typically takes the form of a housing having a cylindrical body portion. The cylindrical body portion may be mounted internally on the distal wall so as to be descendant in a proximal direction. The cyclone may contain a central tube which may extend beyond the distal wall. The cylindrical body portion may extend proximally into a conical nose. The conical nose terminates in the outlet port. The inlet port is typically a tangential inlet port on the cylindrical body portion.

In a preferred embodiment, the cyclone is wholly located inside the particulate recovery chamber. This advantageously achieves a compact design.

In a preferred embodiment, the particulate recovery chamber has a plurality of corners, wherein the cyclone is located in or through one of the corners.

In a preferred embodiment, the cyclone has a first longitudinal axis and the particulate recovery chamber is elongate and has a second longitudinal axis, wherein the first longitudinal axis is substantially parallel (e.g., parallel or inclined to a small degree) to the second longitudinal axis. Preferably the first and second longitudinal axis are descendant in a proximal direction.

The tool typically has a handle which is arranged on the upper part of the housing. In a preferred embodiment, the tool further comprises a handle mounted exteriorly on the housing, wherein either or both of the cyclone and the particulate recovery chamber is arranged beneath the handle. This embodiment is advantageously compact.

In one embodiment, the mass of the cyclone and/or the particulate recovery chamber is minimized. This can be achieved if the material of the cyclone and/or the particulate recovery chamber is a thin metal or plastic. This also keeps costs down. It has been found that such a cyclone is not very sensitive to shocks or touches caused by the operator and therefore may have a long lifetime without losing its effectiveness. In a preferred embodiment, the material of either or both of the cyclone and the particulate recovery chamber is plastic.

The tool may comprise a plurality (e.g., two or three) cyclones. The number of cyclones is generally dependent on the flow of air that has to be cleaned. Preferably, the tool comprises at least two cyclones which are juxtaposed, more preferably juxtaposed within the particulate recovery chamber.

The cyclone and the particulate recovery chamber (and optionally other elements) may form a self-contained unit which is attached to the housing. The unit may be detachable (e.g., for the purposes of maintenance, service or cleaning) from the housing.

The particulate recovery chamber may be emptied from time to time by the operator. For this purpose, the inlet port may be detachably coupled to the outlet.

In a preferred embodiment, the tool further comprises a tube or a hose for coupling the outlet to the inlet port. The tube or hose may be made of plastic and may be mounted on a wall (e.g., an upper wall) of the particulate recovery chamber, preferably on an inner surface of the wall.

In a preferred embodiment, the air vent communicates directly with the surroundings. In a preferred embodiment, the tool further comprises an auxiliary filter mounted across the air vent for capturing minute material particulates.

In a preferred embodiment, the base wall of the particulate recovery chamber is arranged above or level with the base of the housing.

The tool may be deployed upside down (when sanding a ceiling) or in a vertical position (when sanding a vertical wall) or in other positions. In order to ensure good suction, the particulate recovery chamber may be rotatable about its axis.

In a further aspect, the present invention provides a tool for shaping a material comprising a housing adapted externally to remove material particulates from the material;
an outlet in the housing through which in use the material particulates are pneumatically discharged;
a particulate recovery chamber; and at least one cyclone comprising:
an elongate body having a first end and a second end;
an inlet port at or near to the first end of the elongate body, wherein the inlet port is coupled to the outlet;
an outlet port at or near to a second end of the elongate body adapted to convey the material particulates into the particulate recovery chamber; and
an air vent for expelling air from the elongate body.

DETAILED DESCRIPTION OF THE PREFERRED EMBODIMENTS

The present invention seeks to improve the effectiveness of a tool for shaping a material such as a sander (e.g., a belt sander, a vibration sander or a rotation sander) which in use generates particulates (e.g., dust) by deploying cyclonic filtering. In particular, the present invention relates to a tool comprising a cyclone acting as a non-mechanical and non-water based filtering device to substantially prevent the indiscriminate emission of dust during operation.

Figure 1:
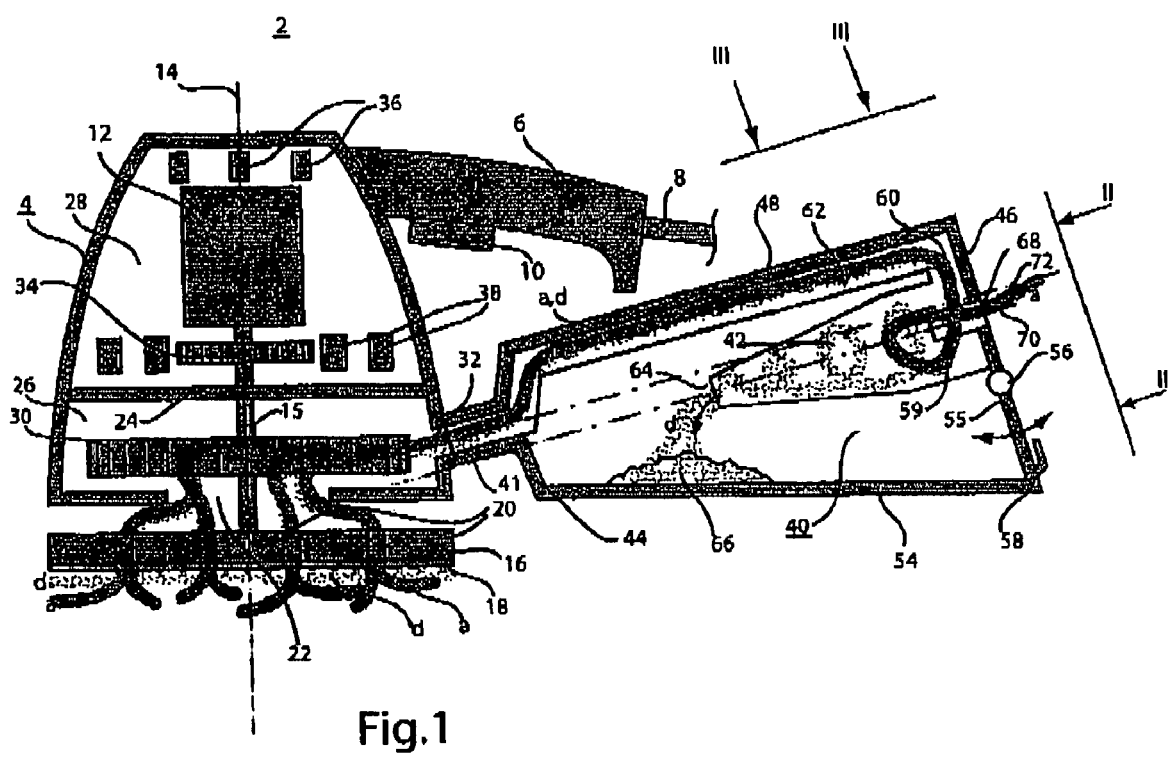
FIG. 1 is a cross-sectional side view of a sanding tool according to a first embodiment of the invention.
Figure 2:
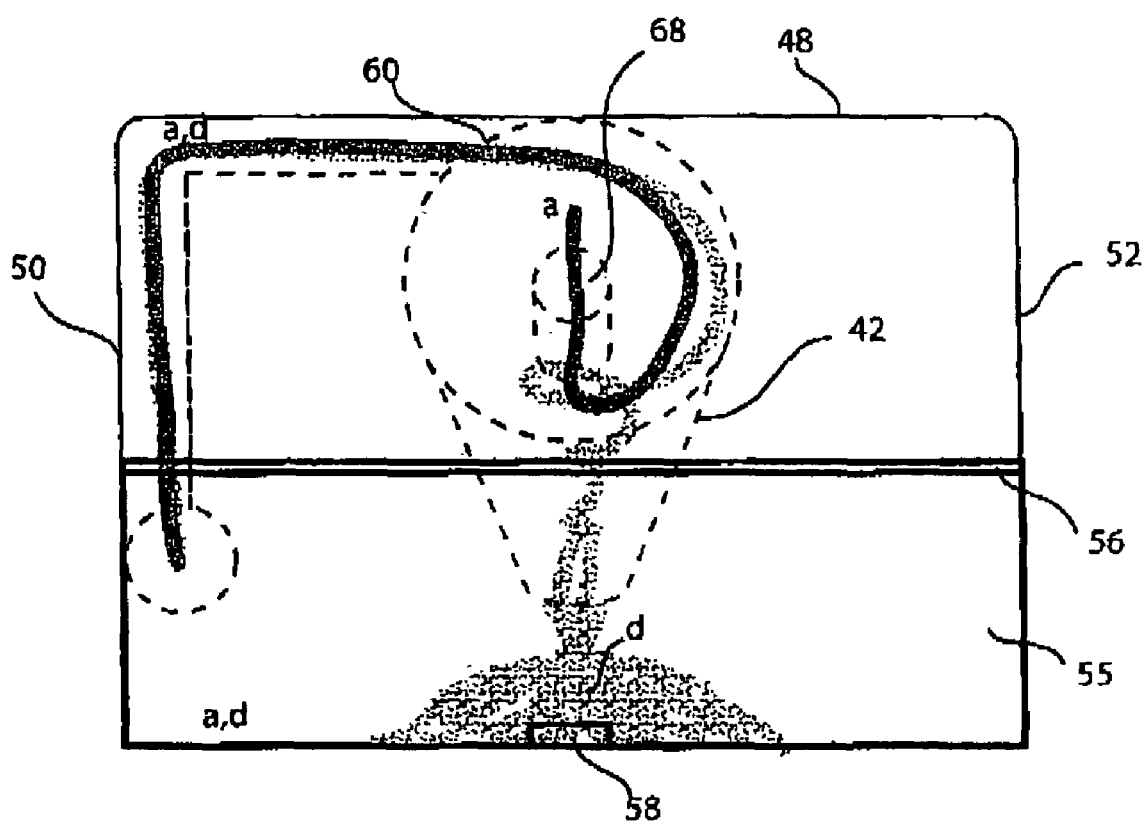
FIG. 2 is a view of the cyclone and particulate recovery chamber of the embodiment of FIG. 1 in the direction II-II.
Figure 3:
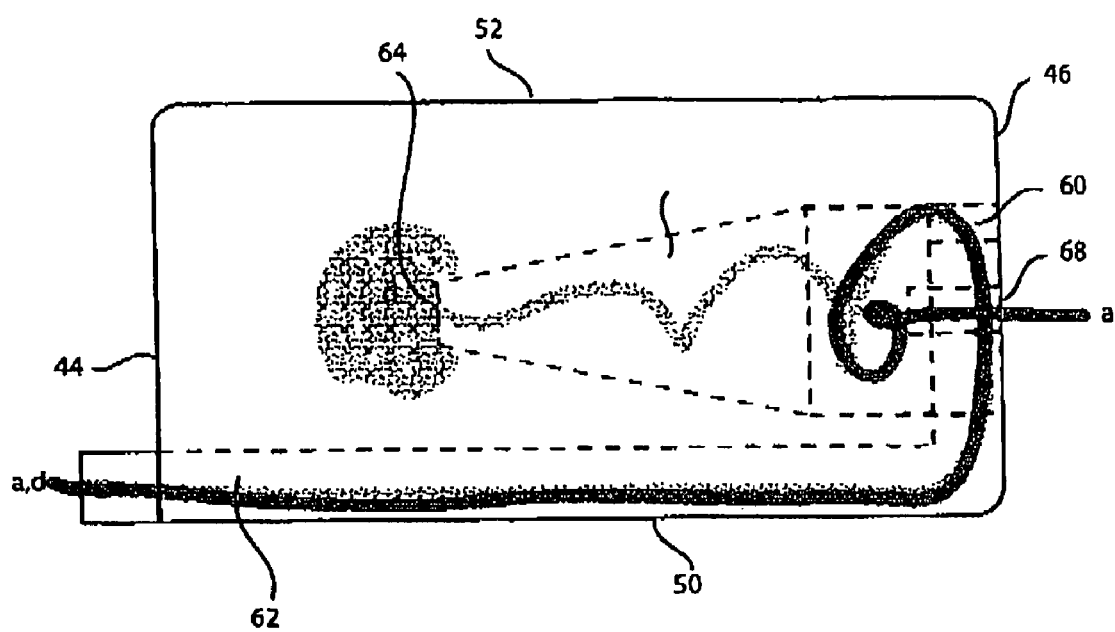
FIG. 3 is a top view of the cyclone and particulate recovery chamber of the embodiment of FIG. 1 in the direction III-III.

FIGS. 1 to 3 illustrate a first embodiment of a tool 2 of the invention being a random orbital sander comprising a housing 4. On its upper portion, the housing 4 has a handle 6 which is provided with a power cable 8 and a power switch 10 for controlling an electric motor 12. The electric motor 12 is arranged on a central axis 14 within the upper part of the housing 4 and has a rotary shaft 15 extending along the central axis 14 for driving a sanding plate or pad 16 located outside the base of the housing 4. The outer surface of the pad 16 holds a replaceable sanding paper 18. The sanding paper 18 is applied to a work piece (such as a piece of wood) which causes dust (denoted by the letter d) to be generated.

A certain separation between the base of the housing 4 and the pad 16 is maintained. There are holes 20 in the sanding paper 18 and in the pad 16. Air (denoted by the letter a) and the dust (d) are sucked through the holes 20 and subsequently through a larger central opening 22 in the base of the housing 4 into the lower part of the housing 4.

A horizontal main partition wall 24 is arranged within the housing 4. The main partition wall 24 defines a lower interior cavity 26 and an upper interior cavity 28. The lower interior cavity 26 contains a transportation fan 30 fixed on the rotary shaft 15 for pneumatically driving air (a) and dust (d) towards an outlet 32 from which it is discharged.

The outlet 32 extends into an attachment tube which is located beneath the handle 6. The upper interior cavity 28 contains the motor 12 and a cooling fan 34. The cooling fan 34 is fixed on the rotary shaft 15 and cools the motor 12 during operation. Several cooling air inlets 36 are provided on the top wall of the housing 4 and several cooling air outlets 38 are provided around the lower portion of the upper interior cavity 28.

Beneath the handle 6 there is attached to the housing 4 by means of a tubular connecting piece 41 a dust recovery chamber 40. The dust recovery chamber 40 accumulates dust (d) by the action of a cyclone 42. The dust recovery chamber 40 and the cyclone 42 may be plastic in order to be relatively lightweight. The cyclone 40 has a central or first longitudinal axis 70 and the dust recovery chamber 40 has a second longitudinal axis 72. The second longitudinal axis 72 and first longitudinal axis 70 are offset. The second longitudinal axis 72 is inclined slightly relative to the first longitudinal axis 70.

The dust recovery chamber 40 has a very compact essentially trapezoidal cross-section comprising a proximal wall 44, a distal wall 46, an upper wall 48, a base wall 54 and side walls 50, 52. The second longitudinal axis 72 and first longitudinal axis 70 are descendant in a direction away from the distal wall 46. The lower portion of the distal wall 46 constitutes a door 55 pivotal about a hinge 56. The door 55 may be opened to remove dust (d) recovered in the dust recovery chamber 40. A lock 58 retains the door 55 in a sealed and locked position during operation.

The cyclone 42 is in the form of a housing having a descendant cylindrical body portion mounted internally on the distal wall 46 and containing a central tube 59. The cylindrical body portion has a tangential inlet port 60 and extends proximally into a conical nose. The inlet port 60 is coupled to the outlet 32 via a plastic tube 62 mounted on the inner surface of the upper wall 48. The conical nose terminates in an outlet port 64 positioned in the central region of the interior of the dust recovery chamber 40. The dust (d) descends the cyclone 42 and is conveyed by the outlet port 64 into a pile 66 on the base wall 54. The cyclone 42 has an air vent 68 arranged flush with the distal wall 46 for expelling clean air directly into the surrounding.

Figure 4:
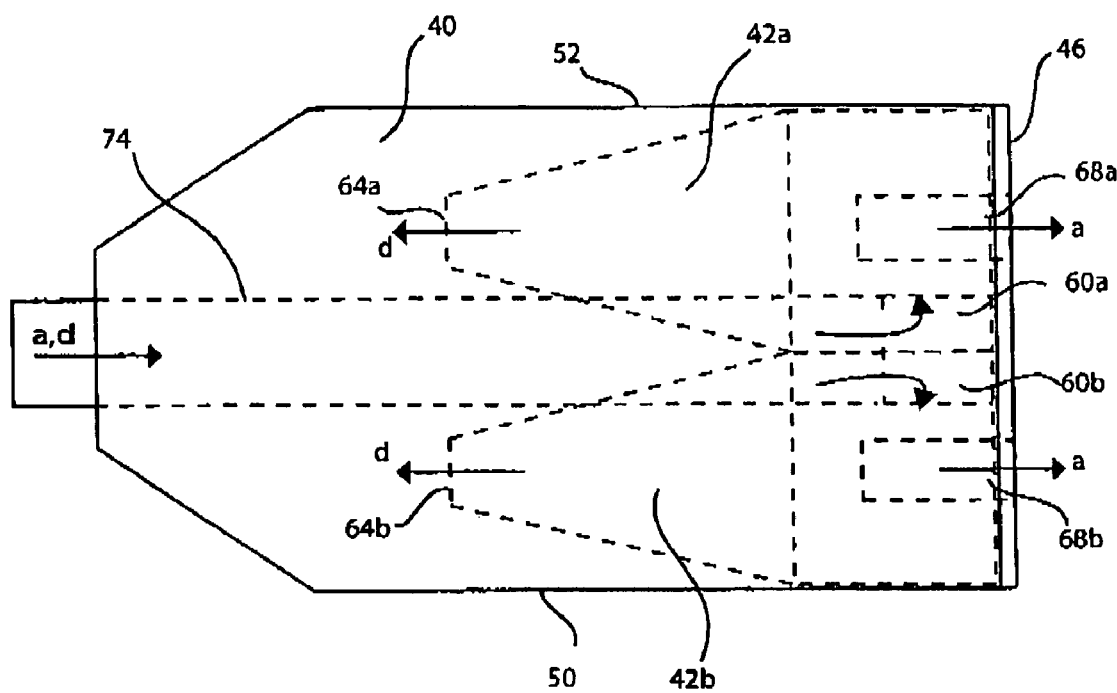
FIG. 4 is a cross-sectional side view of a particulate recovery chamber containing two cyclones.

FIG. 4 is a cross-sectional side view of an alternative dust recovery chamber 40 containing twin cyclones 42a, 42b arranged adjacent and parallel to each other and mounted on the distal wall 46. The respective inlet ports 60a, 60b are coupled to the outlet 32 by a centrally mounted tube 74. The respective outlet ports 64a, 64b are located within the interior of the dust recovery chamber 40. The respective air vents 68a, 68b are arranged flush with the distal wall 46.

Figure 5:
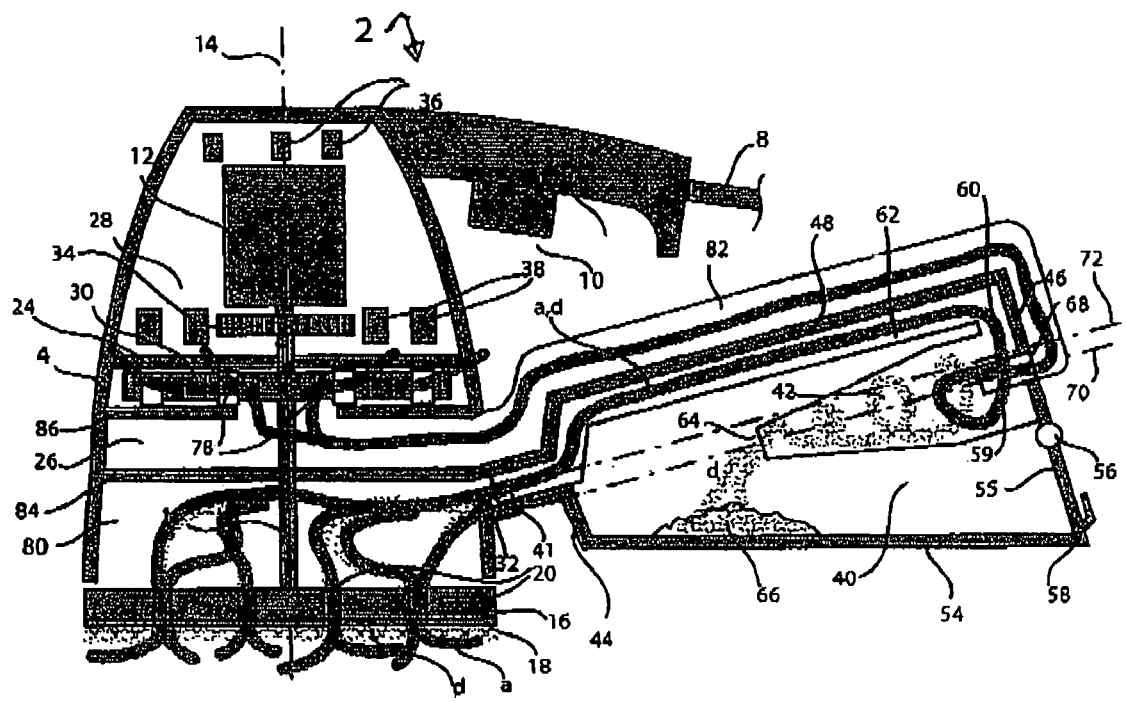
FIG. 5 is a cross-sectional side view of a sanding tool according to a second embodiment of the invention.

FIG. 5 is a cross-sectional side view of a sanding tool 2 according to a second embodiment of the invention comprising a housing 4. Whereas in the embodiment of FIGS. 1 to 3, air (a) and dust (d) are pneumatically driven into the cyclone 42 by the positive action of the transportation fan 30, air a and dust d in this embodiment are caused to be pneumatically discharged into the cyclone 42 by a sucking action.

A main partition wall 24 in the housing 4 defines a lower interior cavity 26 and an upper interior cavity 28. A transportation fan 30 is located within the first interior cavity 26 and is adapted to transport clean air (a) into the surroundings via release outlets 78 distributed around the circumference of the housing 4. An electric motor 12 and a cooling fan 34 are located within the second interior cavity 28. The electric motor 12 drives the fans 30, 34 and the pad 16 bearing the sanding paper 18 by means of a rotary shaft 15.

In the second embodiment, the base of the housing 4 is fully open for transmitting air (a) and dust (d) from a work piece via the holes 20 into an essentially cylindrical cavity 80. This cavity 80 is bound by the upper surface of the pad 16, by the side wall(s) of the housing 4 and by an auxiliary partition wall 84 which is parallel to and beneath the main partition wall 24. In a side wall of the cavity 80 there is an outlet 32.

A block-shaped dust recovery chamber 40 containing a cyclone 42 is firmly connected to the side of the housing 4. Air (a) and dust (d) are conveyed to the inlet 60 by a tube 62 mounted on the inner surface of the upper wall 48.

The air vent 68 communicates indirectly with the surroundings via an air return tube 82 which couples the air vent 68 and an entrance to the lower interior cavity 26. In this embodiment, the air transportation fan 30 sucks clean air from the cyclone 42 and pneumatically discharges the clean air a through the outlets 78 into the surroundings. In order to improve the flow of air a, a guiding wall 86 having a large central opening is positioned between the auxiliary partition wall 84 and the transportation fan 30.

In the embodiment of FIG. 5, a discrete cooling fan 34 may be unnecessary if the transportation fan 30 is also used for cooling the motor 12.

Figure 6:
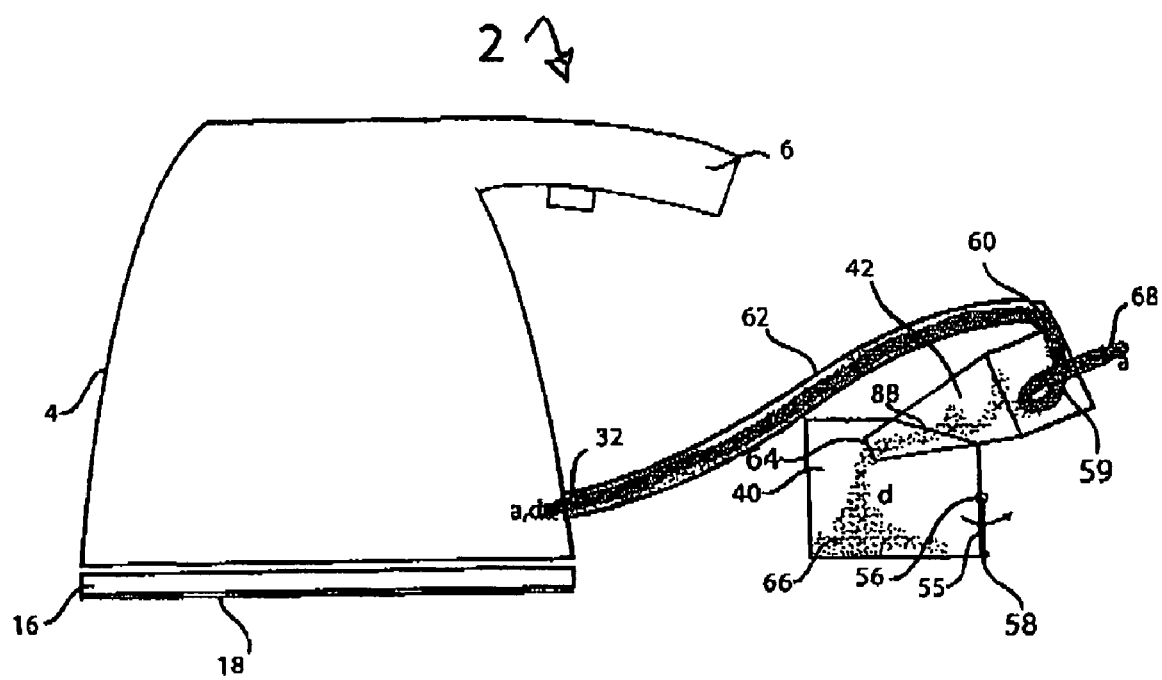
FIG. 6 is a cross-sectional side view of a sanding tool according to a third embodiment of the invention.

FIG. 6 is a cross-sectional side view of a sanding tool 2 according to a third embodiment of the invention where the major portion of a cyclone 42 is located outside a dust recovery chamber 40. The dust recovery chamber 40 is block-shaped and has a plurality of corners 88. The cyclone 42 is disposed through an open one of the upper corners 88. The conical nose of the cyclone 42 extends into the interior of the dust recovery chamber 40 in such a way that the outlet port 64 is located in the middle section of the dust recovery chamber 40. The lower portion of the distal wall 46 of the dust recovery chamber 40 forms a door 55 for removing recovered dust d. For this purpose, the door 55 is pivotal on a hinge 56 when a lock 58 is released.

In this embodiment, an external tube 62 couples the outlet 32 to the tangential inlet 60 of the cyclone 42. The air vent 68 is at the end of the central tube 59.

In the embodiments described hereinbefore, the dust recovery chamber 40 and the cyclone 42 form a unit which during operation is firmly attached to the housing 4. The unit may be detachable for the purpose of maintenance, service or cleaning. Fastening means (not shown) such as bolts and screws are provided.

Figure 7:
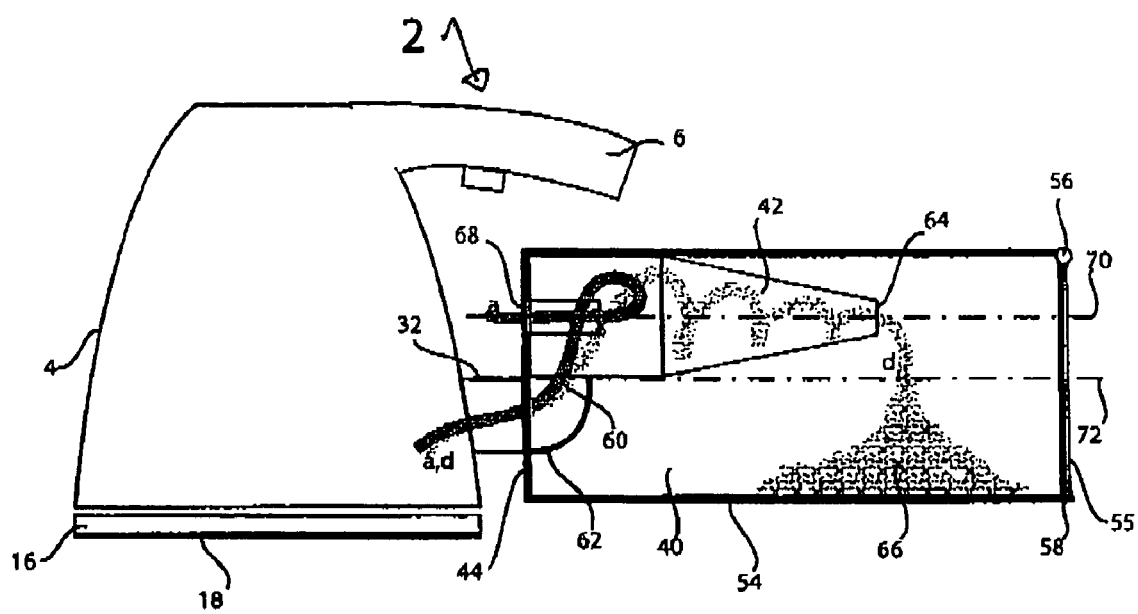
FIG. 7 is a cross-sectional side view of a sanding tool according to a fourth embodiment of the invention.

FIG. 7 is a cross-sectional side view of a sanding tool according to a fourth embodiment of the invention which is constructed in a very compact manner. The housing 4 and the internal elements (not shown) are the same as in FIGS. 1 to 3 and 5. Air a and dust d are discharged from an outlet 32 into an upwardly curved tube 62 which passes through the proximal wall 44 and couples the outlet 32 and the inlet port 60. The dust recovery chamber 40 has a rectangular cross-section. Its bottom wall 54 is parallel to the pad 16. The entire distal wall forms a door 55 which is pivotal on a hinge 56.

In this embodiment, the cyclone 42 is attached to the proximal wall 44. In particular, the cylindrical portion of the cyclone 42 is attached to the upper corner area. Cleaned air a will be released into the space between the housing 4 and the chamber 40. The longitudinal axes 70, 72 are parallel to each other.

Experiments have shown that this embodiment works very well in the horizontal orientation as illustrated. It does not have to be inclined in order to facilitate the emission of dust from the outlet port 64. This embodiment may be used for sanding a floor, a ceiling or a vertical wall.

What is claimed is:

1. A tool for shaping a material comprising:
   a housing adapted externally to remove material particulates from the material;
   an outlet in the housing through which in use the material particulates are pneumatically discharged;
   a particulate recovery chamber having a wall comprising a sealable particulate recovery port; and
   at least one cyclone located inside the particulate recovery chamber, said cyclone comprising:
      an elongate body having a first end and a second end;
      an inlet port at or near to the first end of the elongate body, wherein the inlet port is coupled to the outlet;
      an outlet port at or near to a second end of the elongate body adapted to convey the material particulates into the particulate recovery chamber; and
      an air vent for expelling air from the elongate body.

2. The tool of claim 1, further comprising a fan arranged within the housing so as to drive air and the material particulates through the outlet.

3. The tool of claim 1, further comprising a fan arranged within the housing so as to suck air from the air vent and cause material particulates to be pneumatically discharged from the outlet.

4. The tool of claim 1, wherein the particulate recovery chamber is substantially cuboidal.

5. The tool of claim 1, wherein the particulate recovery chamber has a plurality of corners, and wherein the cyclone is arranged in or through one of the corners.

6. The tool of claim 1, wherein the cyclone has a first longitudinal axis and the particulate recovery chamber is elongate and has a second longitudinal axis, wherein the first longitudinal axis is substantially parallel to the second longitudinal axis.

7. The tool of claim 1, further comprising a handle mounted on the exterior of the housing, wherein either or both of the cyclone and the particulate recovery chamber is arranged beneath the handle.

8. The tool of claim 1, wherein either or both of the cyclone and the particulate recovery chamber is plastic.

9. The tool of claim 1, wherein said tool comprises at least two cyclones in juxtaposition.

10. The tool of claim 1, wherein the cyclone and the particulate recovery chamber form a unit which is attached to the housing.

11. The tool of claim 1, wherein the particulate recovery chamber has an essentially trapezoidal cross-section.

12. The tool of claim 1, wherein the particulate recovery chamber comprises a proximal wall, a distal wall, and at least one side wall, wherein the cyclone is attached to the distal wall.

13. The tool of claim 12, wherein the proximal wall is attached to the housing, and wherein the distal wall incorporates the air vent.

14. The tool of claim 12, further comprising a tube for coupling the outlet to the inlet port.

15. The tool of claim 14, wherein the particulate recovery chamber comprises at least one wall, and wherein the tube is mounted on an inner surface of the wall.

16. The tool of claim 1, wherein the air vent communicates directly with the surroundings.

17. The tool of claim 1, wherein the housing comprises a first interior cavity and a second interior cavity, wherein the first interior cavity is separate from the second interior cavity.

18. The tool of claim 17, further comprising a transportation fan positioned in the first interior cavity and a cooling fan and an electrical motor positioned in the second interior cavity.

19. The tool of claim 18, further comprising an air return tube coupling the air vent and the first interior cavity, and wherein the transportation fan is an air transportation fan.

20. The tool of claim 19, wherein the air return tube is mounted on the exterior of the particulate recovery chamber.

21. The tool of claim 1, wherein the particulate recovery chamber comprises a proximal wall, a distal wall, and at least one side wall, wherein the cyclone is attached to the proximal wall.

22. The tool of claim 21, wherein the particulate recovery chamber has a rectangular cross-section.

23. The tool of claim 1, wherein a base wall of the particulate recovery chamber is arranged higher than or equal to the base of the housing.

24. The tool of claim 1, wherein said tool is a sander.

25. The tool of claim 24, wherein said sander is an electric sander.

* * * * *